Figure 1:
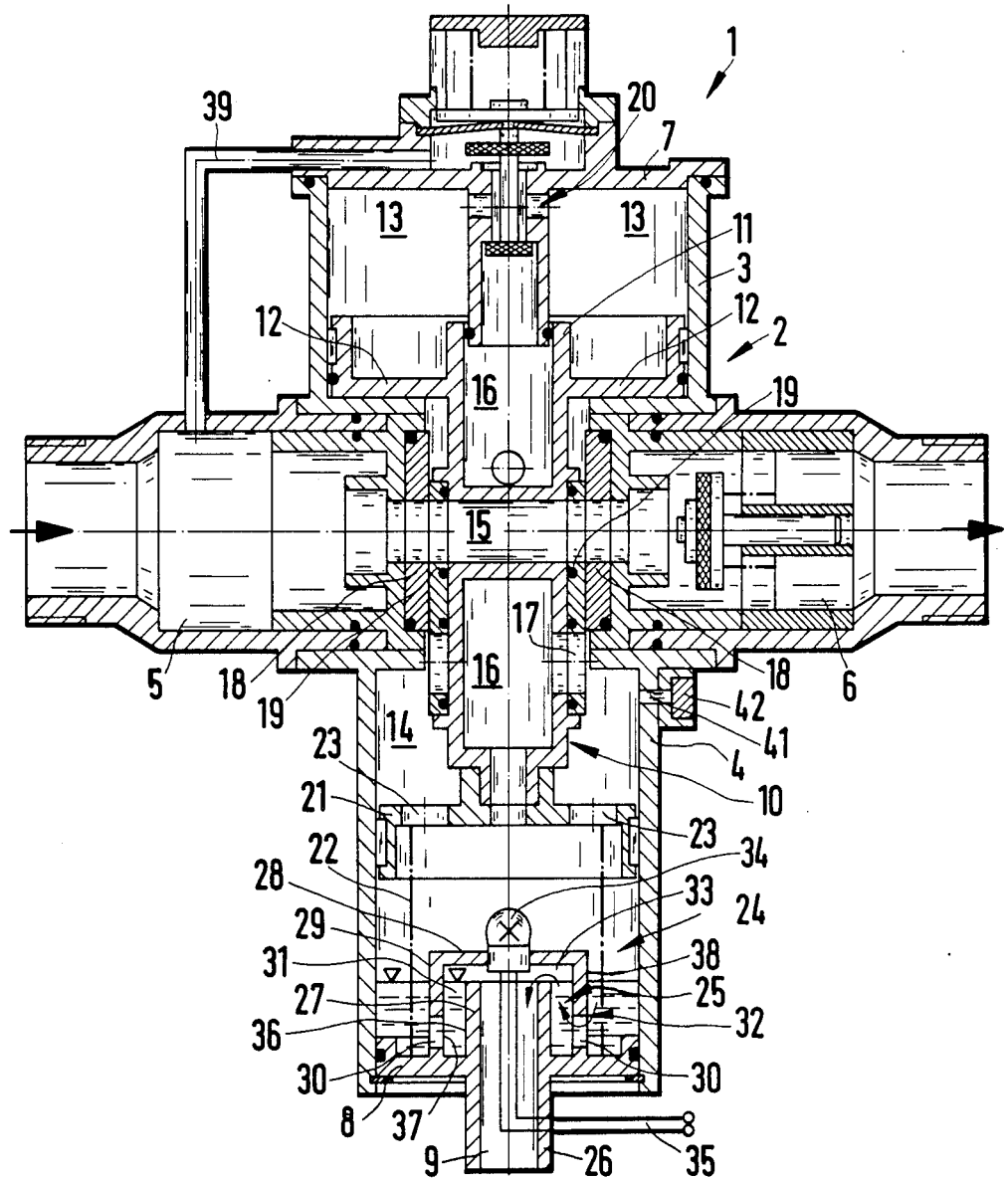

United States Patent [19]

Arens et al.

[11] Patent Number: 4,624,279
[45] Date of Patent: Nov. 25, 1986

[54] TUBE SEPARATOR WITH PROTECTION AGAINST CONTAMINATION

[75] Inventors: Hans Arens, Wertingen; Hans Kern, Vachendorf; Richard Haslberger, Hufschlag, all of Fed. Rep. of Germany

[73] Assignee: Grunbeck Wasseraufbereitung GmbH, Fed. Rep. of Germany

[21] Appl. No.: 642,673

[22] PCT Filed: Dec. 15, 1983

[86] PCT No.: PCT/EP83/00341
§ 371 Date: Aug. 14, 1984
§ 102(e) Date: Aug. 14, 1984

[87] PCT Pub. No.: WO84/02547
PCT Pub. Date: Jul. 5, 1984

[30] Foreign Application Priority Data

Dec. 21, 1982 [DE] Fed. Rep. of Germany ....... 3247320

[51] Int. Cl.[4] ............................................. F16K 24/00
[52] U.S. Cl. .................................... 137/218; 137/107; 137/238; 137/247.33
[58] Field of Search ........... 137/107, 218, 238, 247.11, 137/247.33

[56] References Cited

U.S. PATENT DOCUMENTS

| 246,193 | 8/1881 | O'Grady | 137/247.33 |
| 2,588,284 | 3/1952 | Otis | 137/460 |
| 4,232,704 | 11/1980 | Becker et al. | 137/218 |
| 4,241,752 | 12/1980 | Ackroyd | 137/218 X |

FOREIGN PATENT DOCUMENTS

| 1984 | 5/1979 | European Pat. Off. | 137/218 |
| 2759174 | 11/1980 | Fed. Rep. of Germany | 137/218 |

Primary Examiner—Gerald A. Michalsky
Attorney, Agent, or Firm—Donald Brown; Robert T. Gammons

[57] ABSTRACT

A tube separator (1) having a housing (2) with an inlet (5), an outlet (6) and a separating chamber (14) connectable with a drain (9) is provided. A shut-off member (10) connecting the inlet (5) with the outlet (6) in a first position thereof and separating the inlet (5) from the outlet (6) and connecting the outlet (6) with the separating chamber (14) in a second position is provided between the inlet (5) and the outlet (6). In order to prevent the entry of contaminations into the separating chamber (14) and hence into a line system connectable with the inlet (5) and the outlet (6) the separating chamber (14) is designed in a manner to be tightly sealed against contaminations. To this end preferably a filter (24) is provided between the separating chamber (14) and the drain (9).

8 Claims, 2 Drawing Figures

TUBE SEPARATOR WITH PROTECTION AGAINST CONTAMINATION

The invention refers to a tube separator or backflow preventing device of the kind having a housing with an inlet, an outlet and a separating chamber connectable with the drain and a shutoff member connecting the inlet with the outlet in a first position thereof and separating the inlet from the outlet and connecting the outlet with the separating chamber in a second position.

A tube separator of this kind is for example known from the DE-AS No. 27 59 174. If in this known tube separator the separating member is moved from the first position into the second position, then the separating chamber defined by the housing and the separating member is connected with a drain for draining fluid into a gully or the like. In this position of the separating member the separating chamber is directly connected with the environment via the drain such that contaminations and/or bacteria may arrive at the separating chamber. This danger is aggravated by the fact that the volume of the separating chamber is enlarged and hence air is sucked from the environment during the movement of the separating member into the second position. In a following movement of the separating member into the flow-through position these contaminations and germs will enter the line system in which the tube separator is mounted.

It is the object of the invention to provide an improved tube separator. In particular the entry of contaminations into the tube separator shall be avoided. Furthermore, the structure of the tube separator shall be simple and space-saving.

This object is achieved by a tube separator of the above mentioned kind which according to the invention is characterized in that the separation chamber is structured to be tightly sealed against contaminations.

Further advantages of the invention are presented in the subclaims.

Figure 2:
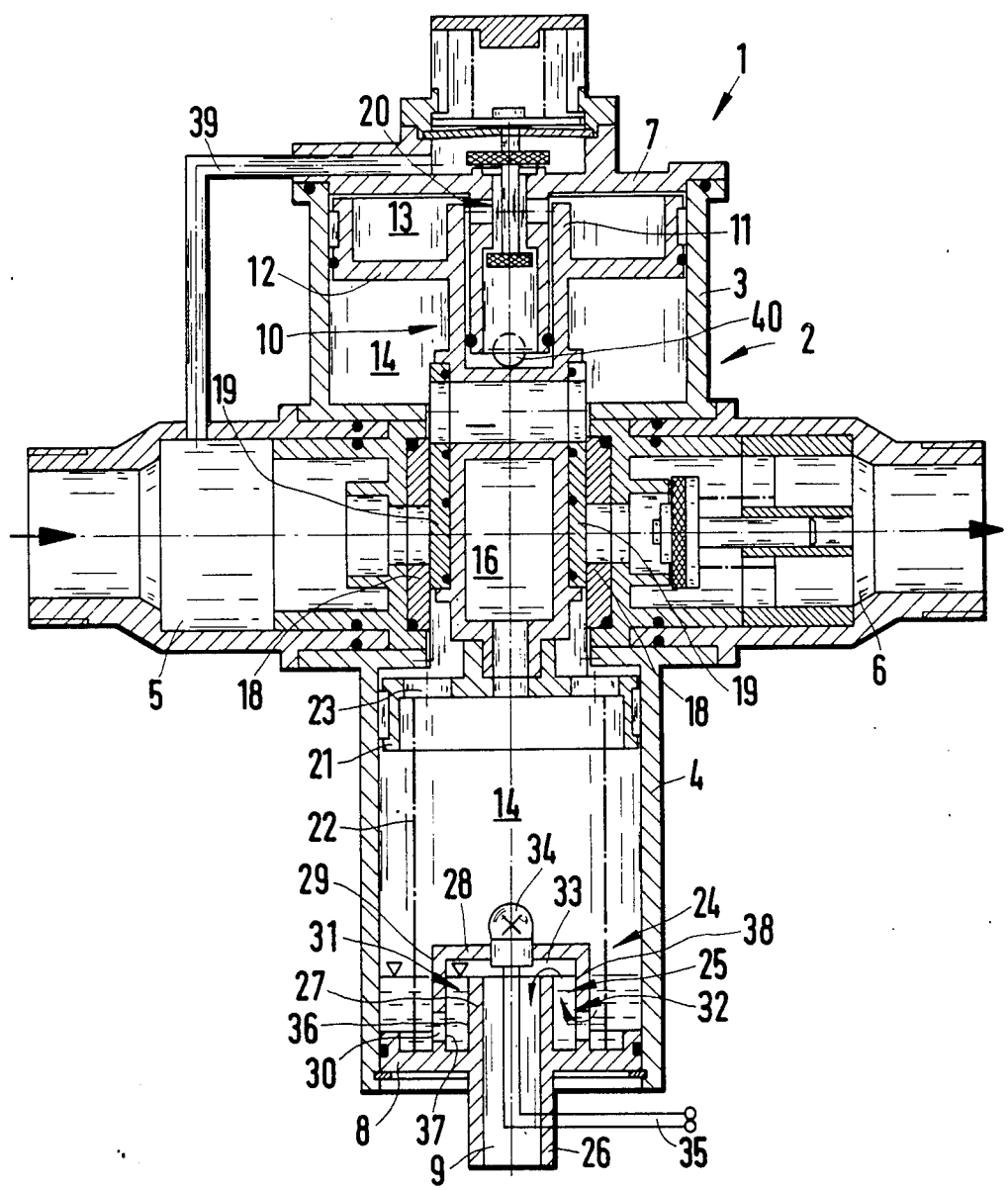

Further features and advantages of the invention will stand out from the description of embodiments in connection with the Figures, in the Figures:

FIG. 1 is a sectional view of a first embodiment of the inventive tube separator with the shut-off member in the first position; and FIG. 2 is a sectional view of a second embodiment of the inventive tube separator with the shut-off member in the second position.

The tube separator 1 comprises a housing 2 with a first cylindrical portion 3 and a second cylindrical portion 4. An inlet 5 to be connected with a tube is provided on one side of the housing 2 between the first cylindrical portion 3 and the second cylindrical portion 4, and an outlet 6 to be connected with a tube is provided at the opposite side of the housing 2 between the first cylindrical portion 3 and the second cylindrical portion 4. On the respective front side opposite to the inlet 5 and the outlet 6 the first cylindrical portion 3 is closed by means of a cap 7 and the second cylindrical portion 4 is covered by means of a plate 8 comprising a drain opening 9.

A shut-off member formed as a slide valve 10 having a piston area 12 at the end 11 thereof which projects into the first cylindrical portion 3 is provided between the inlet 5 and the outlet 6. The piston area 12 divides the space defined by the housing 2, cap 7 and plate 8 into a cylinder space 13 and a separating chamber 14. The slide valve 10 is movable in a direction transversally to the connecting line between inlet 5 and outlet 6 between a first position and a second position in dependence on the pressure within the cylinder space 13.

The slide valve 10 comprises a connecting channel 15 which is connectable with the inlet 5 and the outlet 6 in the first position of the slide valve shown in FIG. 1, as well as an opening 17 connected with the separating chamber 14 via a bore 16 within the slide valve 10. The connecting channel 15 and the opening 17 are designed such that in this first position the inlet 5 and the outlet 6 are connected with each other via the connecting channel 15 and in the second end position of the slide valve 10 the inlet 5 is closed by the slide valve 10 and the outlet 6 is in connection with the separating chamber 14 via the opening 17 and the channel 16. Respective suitable gaskets formed as cooperating flat slide valve gaskets 18, 19 with respective ring gaskets are provided for the sealing between the inlet 5 and the slide valve 10 and the slide valve 10 and outlet 6. The channel 16 is connected with the cylinder space 13 via a valve 20. The slide valve 10 has an abutment plate 21 formed as a spring retainer at the lower end thereof turned away from the piston 12. A compression spring 22 abutting against the plate 8 engages the abutment plate 21 and urges the slide valve 10 in a direction opposite to the effect of the pressure within the cylinder space 13. The abutment plate 21 is laterally guided within the second cylindrical portion 4 and comprises holes 23 forming a connection for the separating chamber on both sides of the abutment plate 21.

A filter 24 formed as a siphon 25 disposed within that region of the separating chamber 14 which is surrounded by the compression spring 22 is provided between the separating chamber 14 and the drain opening 9 for cleaning the air entering the separating chamber 14. To this end a drain pipe 26 surrounding the drain opening 9 has a tubular extension 27 extending through the plate 8 into the separating chamber 14 and being opened towards the separating chamber 14. The extension 27 is surrounded by a cap-shaped cover 28 being disposed concentric with the extension 27 and having a cylindrical side wall 29 being connected with the plate 8 in the region between the drain pipe 26 and the spring 22. The side wall 29 comprises lateral bores 30 having a distance from the plate 8 which is smaller than the height of the extension 27 above the plate 8. The inner diameter of the side wall 29 is selected to be slightly larger than the outer diameter of the extension 27, and the height of the cover 28 is selected to be slightly larger than the height of the extension 27, such that a channel 31 having a vertically extending first section 32 and a horizontally extending second section 33 is formed between the cover 28 and the extension 27. The channel 31 forms a connection of the separating chamber 14 with the drain opening 9.

An ultraviolet radiation source 34 having an electrical connection 35 passing outwards through the drain opening 9 is provided at the upper side of the cover 28 within the separating chamber 14 below the abutment plate 21. The outer surface 36 of the extension 27 and/or the inner surface 37 and/or the outer surface 38 of the side wall 29 are silvercoated by electrolytical deposition.

The valve 20 is designed such that it either forms a connection between the cylinder space 13 and the separating chamber 14 via the channel 16 or seals the separating chamber 14 from the cylinder space 13. Since the cylinder space 13 may only be connected with the inlet 5 via the conduit 39, the separating chamber 14 is all-round tightly closed with respect to the environment. The only outward connection leads through the siphon 25.

In operation the tube separator 1 is mounted in a liquid conduit such that the liquid medium acts upon the inlet 5. If the pressure of this medium is above a preadjusted safety pressure value, then the valve 20 connects the inlet 5 with the cylinder space 13 and the slide valve 10 is in the first position shown in the Figure, in which the inlet 5 and the outlet 6 are connected through the connecting conduit 15. The inlet pressure acts upon the cylinder space 13 and the valve 20 seals the cylinder space 13 with respect to the channel 16 and the separating chamber 14. If the inlet pressure falls below a preadjusted pressure value, then the valve 20 changes over and connects the cylinder space 13 with the separating chamber 14 via the channel 16. Since a lower pressure, namely about the environmental pressure, prevails within the separating chamber 14, the pressure within the cylinder space 13 drops and the compression spring 22 moves the slide valve 10 upwardly into the second end position, in which the opening 17 is aligned with the entrance of outlet 6. Thereby the liquid volume within the cylinder space 13 will be expelled via the channel 16 into the separating chamber and flows into the annular space between the inner wall of the second cylindrical portion 4 and the side wall 29, eventually together with liquid leaving the outlet 6 via the opening 17. A corresponding amount of fluid already present in this annular space and in the channel 31 leaves the siphon 25 via the drain opening 9. Preferably the size of the stroke volume of piston 12 is selected such that in such a changeover operation of the slide valve 10 the total amount of fluid within the siphon 25 is replaced.

When the slide valve 10 moves into the second position the connecting channel 15 is connected with the separating chamber 14. Simultaneously air is sucked in through the drain opening 9 due to the increasing value of the separating chamber 14. Since the separating chamber 14 is connected with the environment only via the siphon 25, this air may enter the separating chamber 14 only via the channel 31. Eventual contaminations of the air are filtered or absorbed, respectively, by the liquid present in the channel 31 and in the annular space between the cylindrical portion 4 and the side wall 29. Germs which by chance may pass the filter 24 are killed by the electrolytic silver-coating of the siphon surfaces and/or the radiation of the UV radiation source 34. Hence, the air within the separating chamber 14 is cleaned and a contamination of the channel 15 in the shut-off position of the slide valve 10 is prevented.

The fact that according to the invention the filter 24 or siphon 25, respectively, are disposed within the space surrounded by the compression spring 22 in the housing 2, results in a space-saving construction without increase in size of the tube separator. However, it is of course possible to provide the filter 24 adjacent to the drain pipe 26 exterior to the tube separator. As well the UV radiation source may be provided at another place within the separating chamber 14. However, it is essential for the operation that the separating chamber 14 has no further connection with the environment except the filter 24, which means in particular that a window for observing the position of the slide valve 10 is tightly fitted in the housing 2.

The second embodiment of the invention shown in FIG. 2 differs from the embodiment according to FIG. 1 in that the opening 17 is not provided and hence no liquid may arrive at the separating chamber 14 from the outlet 6 in the second position of the slide valve 10 shown in FIG. 2. As may be seen from FIG. 2, in this second position of the slide valve 10 the connecting channel 15 is in connection with a region of the separating chamber 14 which has been generated by the upward movement of the slide valve 10 within the first cylindrical portion 3. This region is connected with the separating chamber within the second cylindrical portion 4 by means of a bore 40 provided within the slide valve 10 and the channel 16. Hence, in this embodiment, no contaminations could enter the connecting channel 15 even if they could arrive at the separating chamber 14. However, the later is prevented by the filter 24 such that an entry of contaminations into the line system is no longer possible.

In the embodiment shown in FIG. 1 an air inlet opening 41 which is closed by a bacteria filter 42 is provided in a distance vertically above the siphon in addition to the outlet through the siphon. It is thus achieved that air sucked into the separating chamber 14 from outside always passes the bacteria filter 42, whereas water to be drain passes via the siphon in a bacteria-tight manner.

We claim:

1. A tube separator comprising a housing with an inlet, an outlet, a separating chamber having a bottom plate and with a drain disposed in said bottom plate of said separating chamber, a shutoff member within said housing for connecting said inlet in a first position and for separating said outlet and connecting said outlet with said separating chamber in a second position, a compressing spring disposed in said separating chamber about the drain between said bottom plate and said shutoff member for urging said shutoff member into said first position and a water seal contained within said separating chamber for connecting said separating chamber with said drain, said water seal extending from said bottom plate into a portion of said separating chamber which is surrounded by said compression spring, thereby using a space within said compression spring for placing said water seal.

2. The tube separator of claim 1, wherein said water seal embodies a silver-coated surface.

3. The tube separator of claim 1, comprising a UV radiation source disposed within said separating chamber.

4. A tube separator comprising a housing with an inlet, an outlet, a drain and a separating chamber, a shutoff member for connecting said inlet with said outlet in a first position and for separating said inlet from said outlet and connecting said outlet with said separating chamber in a second position, a water seal connecting said separating chamber with said drain, an air inlet opening provided in said housing for admitting air to said separating chamber from outside and a bacteria filter closing said air inlet opening for cleaning air entering said separating chamber from contaminations and bacteria.

5. The tube separator of claim 4, wherein said water seal embodies a silver-coated surface.

6. The tube separator of claim 4, comprising a UV radiation source disposed within said separating chamber.

7. A tube separator comprising a housing with an inlet, an outlet and a separating chamber, said separating chamber containing an opening connectable with a drain, a shutoff member situated in the housing movable from a first position connecting said inlet with said outlet in a first position and for separating said inlet from said outlet and connecting said outlet with said separating chamber in a second position and sealing means for tightly sealing said separating chamber against contaminations.

8. A tube separator comprising a housing having an inlet, an outlet, a drain and a separating chamber, a shutoff member for connecting said inlet with said outlet in a first position and for separating said inlet from said outlet and connecting said outlet with said separating chamber in a second position, and a water seal for connecting said separating chamber with said drain, whereby air entering said separating chamber is cleaned of contamination or bacteria.

* * * * *